(12) United States Patent
Harleman, Jr. et al.

(10) Patent No.: US 11,827,385 B2
(45) Date of Patent: Nov. 28, 2023

(54) DIRECT MOUNT OF SECONDARY PAYLOAD ADAPTERS TO TRUSS STRUCTURE COMMON TO SPACE VEHICLE PAYLOAD ADAPTER

(71) Applicant: The Boeing Company, Chicago, IL (US)

(72) Inventors: Thomas J. Harleman, Jr., Maple Valley, WA (US); Cary D. Munger, Woodinville, WA (US); Karsten James, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/648,225

(22) Filed: Jan. 18, 2022

(65) Prior Publication Data

US 2022/0242596 A1 Aug. 4, 2022

Related U.S. Application Data

(60) Provisional application No. 63/145,331, filed on Feb. 3, 2021.

(51) Int. Cl.
  *B64G 1/64* (2006.01)
(52) U.S. Cl.
  CPC .............. *B64G 1/641* (2013.01); *B64G 1/643* (2023.08)
(58) Field of Classification Search
  CPC .... B64G 1/641; B64G 2001/643; B64G 1/22; B64G 1/645; B64G 1/002; B64G 2001/1092; B64G 1/10; B64G 1/1085
  See application file for complete search history.

(56) References Cited

U.S. PATENT DOCUMENTS

| | | | |
|---|---|---|---|
| 5,806,797 A * | 9/1998 | Micale | G05B 19/41805 244/131 |
| 6,138,951 A * | 10/2000 | Budris | B64G 1/645 102/393 |
| 6,793,183 B1 * | 9/2004 | Hand | B64G 1/641 244/158.1 |
| 8,393,582 B1 | 3/2013 | Kutter et al. | |

(Continued)

FOREIGN PATENT DOCUMENTS

| | | |
|---|---|---|
| EP | 2990686 | 3/2016 |
| RU | 2725824 | 7/2020 |
| WO | WO 2008/147461 A1 | 12/2008 |

*Primary Examiner* — Medhat Badawi
*Assistant Examiner* — Vicente Rodriguez
(74) *Attorney, Agent, or Firm* — Haynes and Boone, LLP

(57) ABSTRACT

Systems, methods, and apparatuses for the direct mount of secondary payload adapters to a truss structure common to a space vehicle payload adapter are disclosed herein. In one or more embodiments, a method for reacting loads into a space vehicle payload adapter comprises reacting, by more than two interstitial rings of the space vehicle payload adapter, the loads created by secondary payloads mounted onto the space vehicle payload adapter, into a truss structure of the space vehicle payload adapter. The method further comprises reacting, by struts of the truss structure, the loads to a forward ring and an aft ring of the space vehicle payload adapter. In one or more embodiments, the reacting of the loads maintains high frequency (e.g., greater than (>) thirty (30) gigahertz (GHz)) modes for the space vehicle payload adapter.

18 Claims, 14 Drawing Sheets

(56) References Cited

U.S. PATENT DOCUMENTS

| | | | |
|---|---|---|---|
| 2006/0192057 A1* | 8/2006 | Smith | B64G 1/641 |
| | | | 244/173.1 |
| 2008/0078886 A1* | 4/2008 | Foster | B64G 1/1078 |
| | | | 244/173.1 |
| 2009/0127398 A1* | 5/2009 | Johnson | B64G 1/402 |
| | | | 244/158.1 |
| 2017/0036782 A1* | 2/2017 | Dula | B64G 1/402 |
| 2021/0139168 A1 | 5/2021 | Eaton et al. | |
| 2021/0139169 A1 | 5/2021 | Eaton et al. | |

* cited by examiner

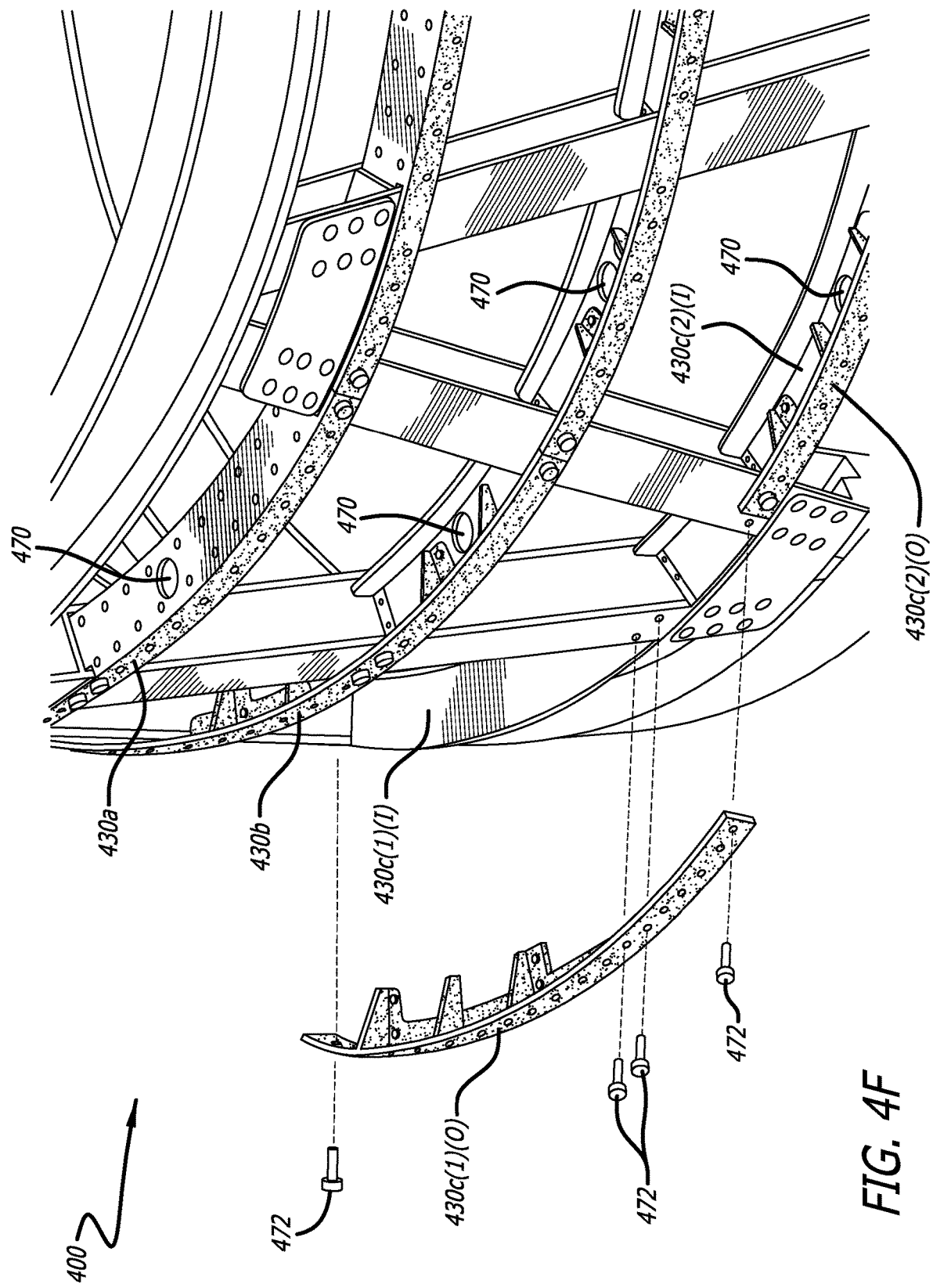

DIRECT MOUNT OF SECONDARY PAYLOAD ADAPTERS TO TRUSS STRUCTURE COMMON TO SPACE VEHICLE PAYLOAD ADAPTER

CROSS-REFERENCE TO RELATED APPLICATIONS

This application claims the benefit of the filing date and right of priority under 35 U.S.C. § 119(e) of U.S. Provisional Patent Application No. 63/145,331, filed Feb. 3, 2021, the disclosure of which is incorporated herein by reference in its entirety.

FIELD

The present disclosure relates to space vehicle payload adapters. In particular, the present disclosure relates to the direct mount of secondary payload adapters to a truss structure common to a space vehicle payload adapter.

BACKGROUND

Launch vehicles often employ a space vehicle payload adapter to attach multiple satellites to enable a shared launch for multiple satellites (e.g., a shared launch including a primary satellite along with several small secondary satellites) from the surface of Earth into space. Currently, conventional space vehicle payload adapters often employ a solid monocoque ring design (e.g., refer to the space vehicle payload adapter ring 100 of FIG. 1). Since this conventional design comprises a solid ring structure, the design is able to provide for stiffness at the interfaces of the secondary payload adapters such that high frequency modes are maintained (e.g., during the duration of the launch). However, the solid ring structure of this conventional design has the disadvantages of being heavy, expensive to manufacture, and not providing for easy access to components located internal to the ring.

In light of the foregoing, there is a need for an improved space vehicle payload adapter design that provides for a reduction in weight and cost, and allows for an easier access to internal components, while also maintaining high frequency modes.

SUMMARY

The present disclosure relates to a method, system, and apparatus for the direct mount of secondary payload adapters to a truss structure common to a space vehicle payload adapter. In one or more embodiments, a method for reacting loads into a space vehicle payload adapter comprises reacting, by more than two interstitial rings of the space vehicle payload adapter, the loads created by secondary payloads mounted onto the space vehicle payload adapter, into a truss structure of the space vehicle payload adapter. The method further comprises reacting, by struts of the truss structure, the loads to a forward ring and an aft ring of the space vehicle payload adapter. In one or more embodiments, the reacting of the loads maintains high frequency (e.g., greater than (>) thirty (30) gigahertz (GHz)) modes for the space vehicle payload adapter.

In one or more embodiments, the secondary payloads are mounted onto the space vehicle payload adapter via secondary payload adapters. In some embodiments, the secondary payloads are mounted onto the secondary payload adaptors via kinematic mount bolts and/or easy ride adapters. In at least one embodiment, each of the secondary payload adapters are releasably attached to various different locations on at least one of the interstitial rings. In some embodiments, adapter port openings of the secondary payload adapters are of different sizes. In one or more embodiments, each of the adapter port openings comprises one of a circular shape, a rectangular shape, a triangular shape, or a polygon shape. In one or more embodiments, the adapter port openings comprise shapes complementary to interfaces of the secondary payloads. In some embodiments, the secondary payload adapters are manufactured from aluminum, titanium, and/or a composite material.

In at least one embodiment, the struts connect the forward ring to the aft ring. In one or more embodiments, the struts are oriented at consistent angles to form alternately inverted isosceles triangle-shaped openings within the truss structure.

In one or more embodiments, the interstitial rings are connected to the struts via a nested joint configuration. In some embodiments, the interstitial rings are located between the forward ring and the aft ring. In at least one embodiment, at least one of the interstitial rings is a partial interstitial ring. In some embodiments, at least one of the interstitial rings comprises a plurality of segments. In one or more embodiments, each of the segments comprises an inner portion and an outer portion.

In at least one embodiment, the interstitial rings, the struts, the forward ring, and/or the aft ring are manufactured from aluminum, titanium, and/or a composite material.

In one or more embodiments, a space vehicle payload adapter comprises a forward ring and an aft ring. The space vehicle payload adapter further comprises a truss structure comprising a plurality of struts, where the struts connect the forward ring to the aft ring. Also, the space vehicle payload adapter comprises more than two interstitial rings connected to the struts, and positioned between the forward ring and the aft ring. Further, the space vehicle payload adapter comprises a plurality of secondary payload adapters each releasably attached to at least one of the interstitial rings. In one or more embodiments, the interstitial rings react loads, created by secondary payloads mounted onto the secondary payload adapters, into the truss structure. In at least one embodiment, the struts of the truss structure react the loads to the forward ring and the aft ring. In at least one embodiment, high frequency modes for the space vehicle payload adapter are maintained for the space vehicle payload adapter, when the loads are reacted.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 4F is an exploded detailed view of the diagram of FIG. 4E showing details of the two-part design of the interstitial rings of the disclosed space vehicle payload adapter of FIG. 4A, in accordance with at least one embodiment of the present disclosure.

DESCRIPTION

Figure 1:
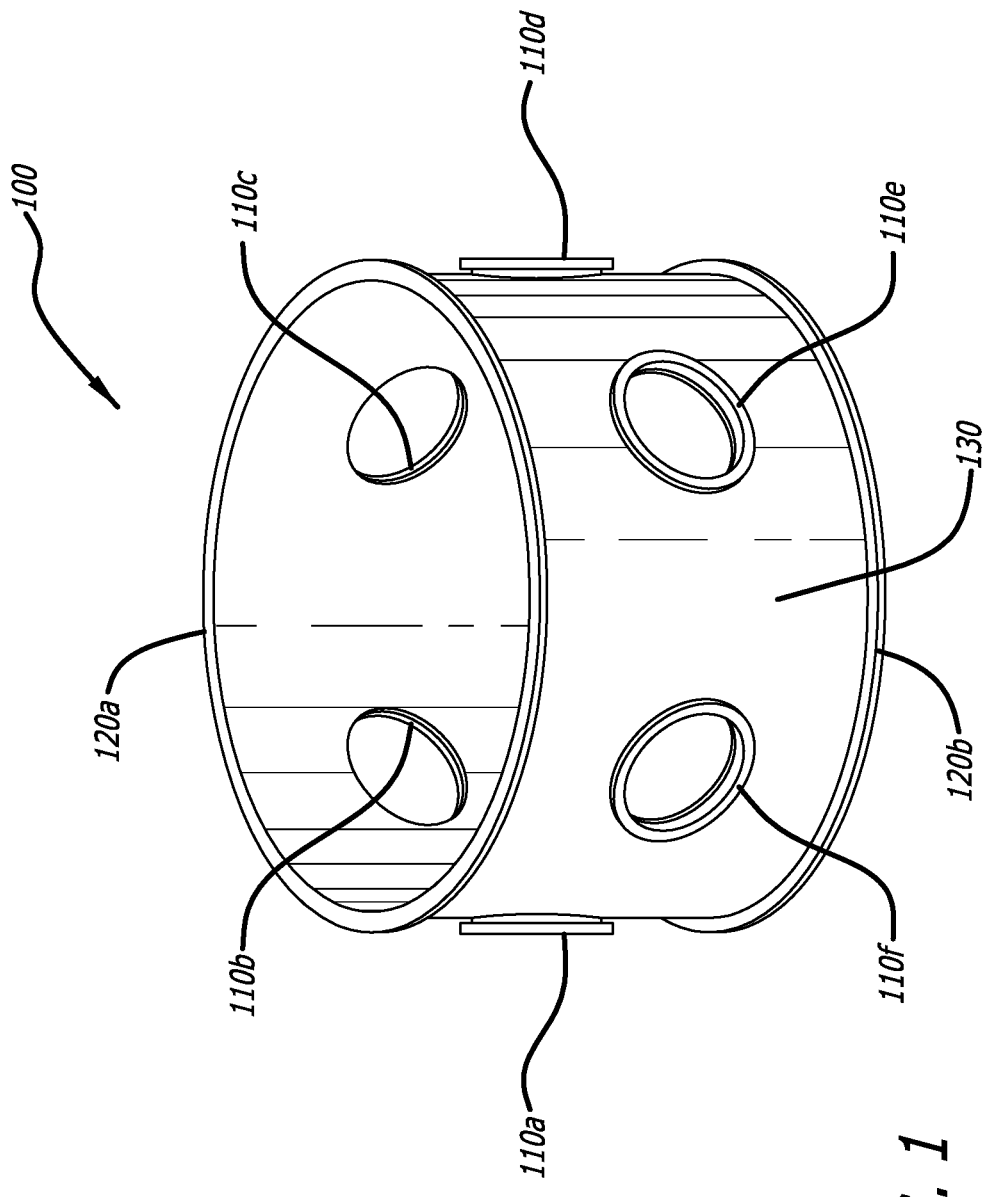
FIG. 1 is a diagram showing a perspective view of a conventional space vehicle payload adapter.

The methods and apparatuses disclosed herein provide operative systems for the direct mount of secondary payload adapters to a truss structure common to a space vehicle payload adapter. In one or more embodiments, the system of the present disclosure employs a plurality of interstitial rings within a space vehicle payload adapter, which comprises a lightweight truss structure, to provide stiffness at the interfaces of the secondary payload adapters to maintain high frequency (e.g., greater than (>) thirty (30) gigahertz (GHz)) modes. The disclosed system also employs secondary payload adapters that are clockable to allow for the rotation of the secondary payloads to different locations around the circumference of the space vehicle payload adapter to optimize the center of gravity (CG) for the launch vehicle.

As previously mentioned above, launch vehicles often employ a space vehicle payload adapter to attach multiple satellites to enable a shared launch for multiple satellites (e.g., a shared launch including a primary satellite (e.g., a primary payload) along with several small secondary satellites (e.g., secondary payloads)) from the surface of Earth into space. Currently, conventional space vehicle payload adapters often employ a solid monocoque ring design (e.g., refer to the space vehicle payload adapter ring 100 of FIG. 1). Since this conventional design comprises a solid ring structure, the design is able to provide for stiffness at the interfaces of the secondary payload adapters (refer to 110a, 110b, 110c, 110d, 110e, 110f of FIG. 1) such that high frequency modes (e.g., >30 GHz) are maintained (e.g., during the duration of the launch). However, the solid ring structure of this conventional design has the disadvantages of being heavy, expensive to manufacture, and not providing for easy access to components located internal to the ring.

The system of the present disclosure provides a means to add secondary payloads to a space vehicle payload adapter, which fits between the top of a rocket (e.g., a launch vehicle) and the primary payload, that maintains the high frequency modes of a conventional monocoque ring design, while also utilizing a sparse truss structure that allows for an easier installation of the secondary payloads as well as easy access to internal components (e.g., during payload buildup and test). The disclosed space vehicle payload adapter allows for a reduction in weight and cost as compared to the conventional monocoque ring designs, while maintaining the stiffness at the interfaces of the secondary payload mounts. In particular, the disclosed space vehicle payload adapter employs multiple interstitial rings (e.g., more than two interstitial rings) that interface with the secondary payload adapters as well as with the truss structure. With this disclosed design, the interstitial rings provide a load path to react the bending loads (e.g., loads caused by the secondary payloads) into the truss structure.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. In addition, those skilled in the art will appreciate that embodiments of the present disclosure may be practiced in conjunction with other components, and that the systems described herein are merely example embodiments of the present disclosure.

For the sake of brevity, conventional techniques and components related to space vehicle payload adapters, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

FIG. 1 is a diagram showing a perspective view of a conventional space vehicle payload adapter 100. In this figure, the conventional space vehicle payload adapter 100 is shown to comprise a solid monocoque ring design. The conventional space vehicle payload adapter (e.g., referred to as a ring) 100 comprises a single aluminum forging that is machined down to its flanges 120a, 120b and its secondary payload adapters (e.g., in the form of webs) 110a, 110b, 110c, 110d, 110e, 110f, which are each typically around a half an inch thick. The monocoque structure of the conventional space vehicle payload adapter 100 inherently defines a shell 130. The shell 130 of the ring 100 carries the stress of any loads exerted upon the space vehicle payload adapter 100.

It should be noted that, since the secondary payload adapters (e.g., webs) 110a, 110b, 110c, 110d, 110e, 110f are machined into the ring 100, the locations of the secondary payload adapters 110a, 110b, 110c, 110d, 110e, 110f on the exterior circumference of the ring 100 are fixed. As such, the conventional space vehicle payload adapter 100 design does not provide the ability to clock (e.g., rotate) the secondary payloads to different locations on the exterior circumference ring 100 to optimize the center of gravity (CG) for the space vehicle (e.g., a launch vehicle combined with the payloads).

In addition, the conventional space vehicle payload adapter 100 design makes access to the inside of the ring 100 very difficult because the interior of the ring 100 cannot be accessed from the secondary payload adapters 110a, 110b, 110c, 110d, 110e, 110f located on the periphery of the ring 100, after the secondary payloads are mounted onto the ring 100. Additionally, the thickness (e.g., typically around a half an inch) of the secondary payload adapters 110a, 110b, 110c, 110d, 110e, 110f provides a relatively stiff interface at the cost of considerable weight.

Figure 2:
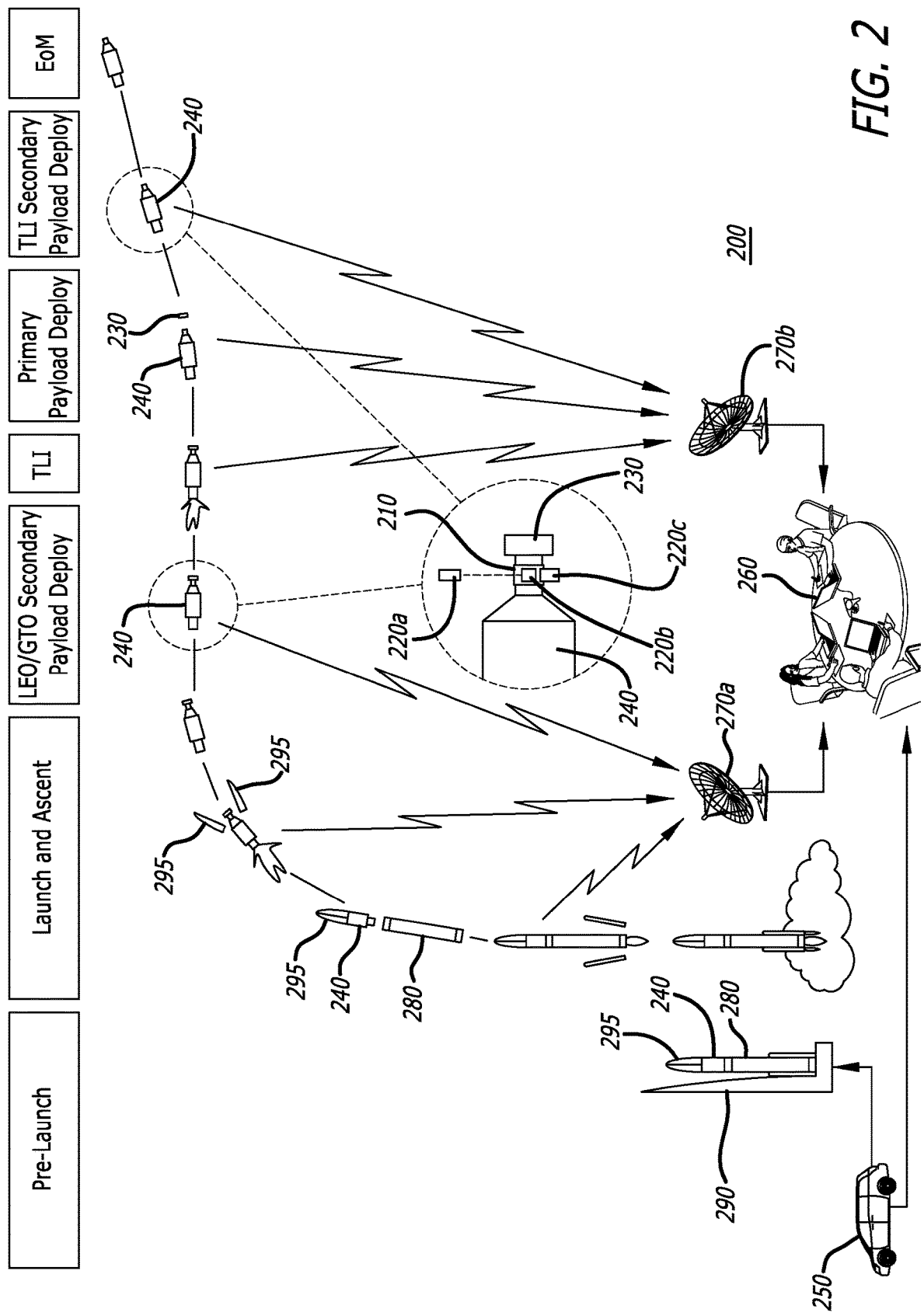
FIG. 2 is a diagram (not to scale) showing an exemplary launch sequence for a spacecraft that employs the disclosed space vehicle payload adapter, in accordance with at least one embodiment of the present disclosure.

FIG. 2 is a diagram (not to scale) showing an exemplary launch sequence 200 for a spacecraft (e.g., a primary satellite, referred to as a primary payload) 230 that employs the disclosed space vehicle payload adapter 210, in accordance with at least one embodiment of the present disclosure. In this figure, the primary payload 230 as well as a plurality of secondary satellites (e.g., referred to as secondary payloads) 220a, 220b, 220c are mounted onto a launch vehicle (e.g., the launch vehicle upper stage (LVUS)) 240 via the disclosed space vehicle payload adapter 210. The primary payload 230, the secondary payloads 220a, 220b, 220c, and the space vehicle payload adapter 210 are all initially housed within the payload fairing 295 of the launch vehicle (e.g., LVUS) 240.

At the beginning of the launch sequence 200, during pre-launch phase of the launch sequence 200, a payload van (PVAN) 250 comprising electrical ground support equipment (EGSE) is in communication (e.g., transmitting auxiliary (AUX) payload (PL) telemetry (TLM)) with a spacecraft operations center (SOC) 260 as well as with the launch vehicle (e.g., LVUS) 240. The launch vehicle (e.g., LVUS) 240 is connected to a launch vehicle lower stage (LVLS) 280, and is located on a launch pad 290 on the ground.

During launch, the primary payload 230 as well as the secondary payloads 220a, 220b, 220c experience high levels of vibration. As such, it is important that the space vehicle payload adapter 210 is manufactured and designed to have sufficient stiffness such that high frequency modes (e.g., >30 GHz) are maintained during all phases of the launch sequence.

During the launch and ascent phase of the launch sequence 200, the LVLS 280 separates from the launch vehicle (e.g., LVUS) 240, and the payload fairing 295 separates from the launch vehicle (e.g., LVUS) 240. Also, during the launch and ascent phase, the launch vehicle (e.g., LVUS) 240 transmits telemetry information to the SOC 260 via a ground station antenna 270a.

In one or more embodiments, when the launch vehicle (e.g., LVUS) 240 has reached a lower earth orbit (LEO) or a geostationary transfer orbit (GTO), at least one of the secondary payloads 220a, 220b, 220c mounted onto the disclosed space vehicle payload adapter 210 is deployed into space. Also, when the launch vehicle (e.g., LVUS) 240 has reached a lower earth orbit (LEO) or a geostationary transfer orbit (GTO), the launch vehicle (e.g., LVUS) 240 transmits telemetry information to the SOC 260 via the ground station antenna 270a.

Then, the launch vehicle (e.g., LVUS) 240 performs a first trans-launch injection (TLI) maneuver, which is a population maneuver. During the first TLI maneuver, the launch vehicle (e.g., LVUS) 240 transmits telemetry information to the SOC 260 via a ground station antenna 270b.

After the first TLI maneuver, the primary payload 230 mounted onto the disclosed space vehicle payload adapter 210 is deployed into space. During the deployment, the launch vehicle (e.g., LVUS) 240 transmits telemetry information to the SOC 260 via the ground station antenna 270b.

In one or more embodiments, the launch vehicle (e.g., LVUS) 240 performs a secondary TLI maneuver. During this secondary TLI maneuver, at least one of the secondary payloads 220a, 220b, 220c mounted onto the disclosed space vehicle payload adapter 210 is deployed into space. Also, during this secondary TLI maneuver, the launch vehicle (e.g., LVUS) 240 transmits telemetry information to the SOC 260 via a ground station antenna 270b. After the secondary TLI maneuver, it is the end of the mission (EoM) for the launch sequence 200.

It should be noted that the launch sequence 200 depicted in FIG. 2 is merely one exemplary launch sequence of phases that may be employed for a spacecraft (e.g., a primary payload) 230 utilizing the disclosed space vehicle payload adapter 210. As such, in one or more embodiments, launch sequences other than the specific launch sequence 200 shown in FIG. 2 may be employed by a spacecraft (e.g., a primary payload) 230 utilizing the disclosed space vehicle payload adapter 210. For example, in one or more embodiments, during the launch sequence, after the spacecraft (e.g., a primary payload) 230 separates from the space vehicle payload adapter 210, the space vehicle payload adapter 210 may then separate from the launch vehicle (e.g., LVUS) 240. In another example, during the launch sequence, at least one of the secondary payloads 220a, 220b, 220c mounted onto the disclosed space vehicle payload adapter 210 may be hosted on the space vehicle payload adapter 210 for the duration of the life of the secondary payload(s) 220a, 220b, 220c. For another example, during the launch sequence, the secondary payloads 220a, 220b, 220c may be deployed from the space vehicle payload adapter 210 into different specific orbital states and/or locations.

Figure 3:
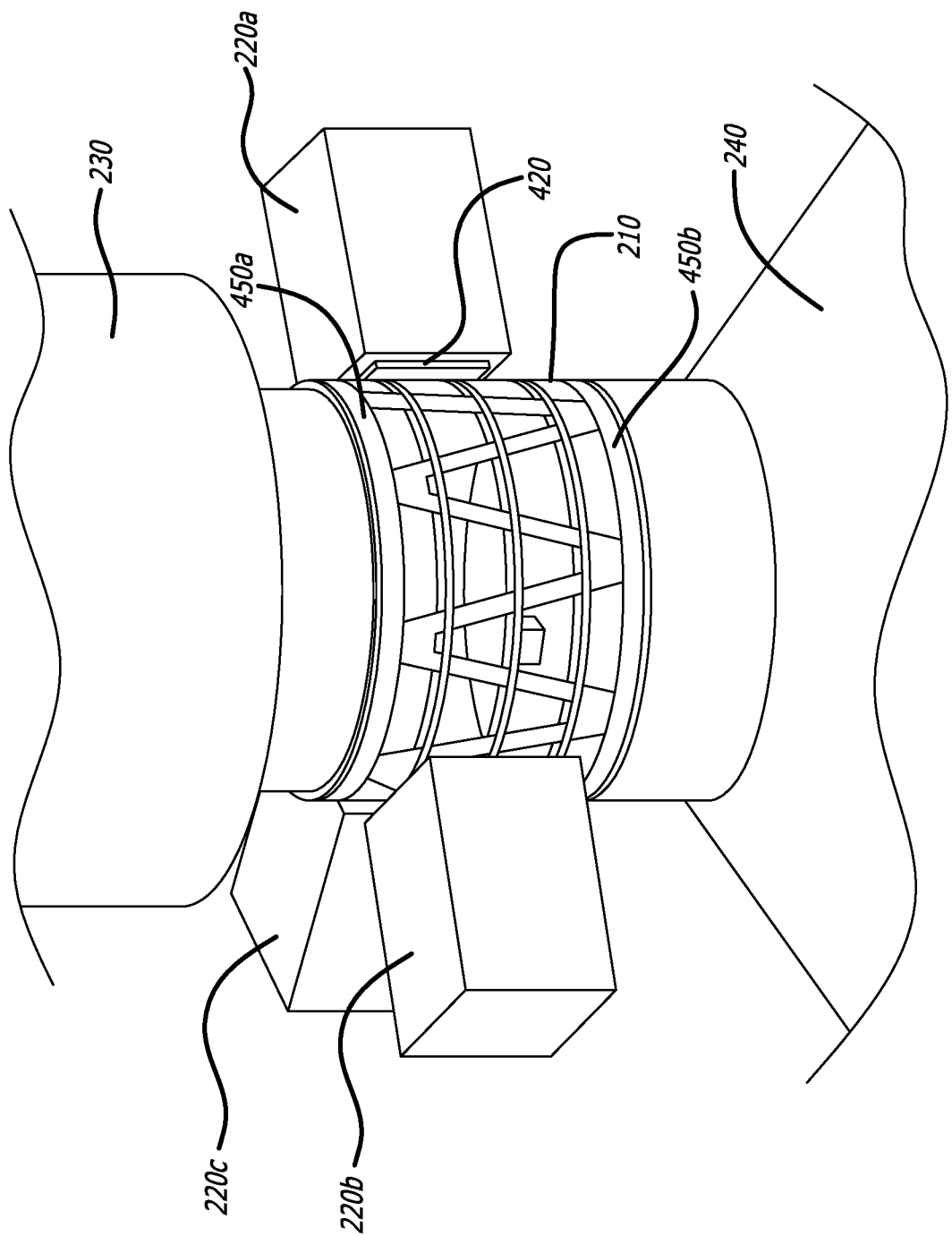
FIG. 3 is a diagram showing details of the disclosed space vehicle payload adapter of FIG. 2, in accordance with at least one embodiment of the present disclosure.

FIG. 3 is a diagram showing details of the disclosed space vehicle payload adapter 210 of FIG. 2, in accordance with at least one embodiment of the present disclosure. In this figure, the space vehicle payload adapter 210 is located in beneath a primary payload 230, and is located above a launch vehicle (e.g., LVUS) 240. In particular, the primary payload 230 is attached (e.g., releasably attached) to a forward ring 450a of the space vehicle payload adapter 210, and the launch vehicle (e.g., LVUS) 240 is attached to an aft ring 450b of the space vehicle payload adapter 210. In addition, a plurality of secondary payloads 220a, 220b, 220c are attached (e.g., releasably attached) to the periphery of the space vehicle payload adapter 210 via secondary payload adapters 420.

Figure 4A:
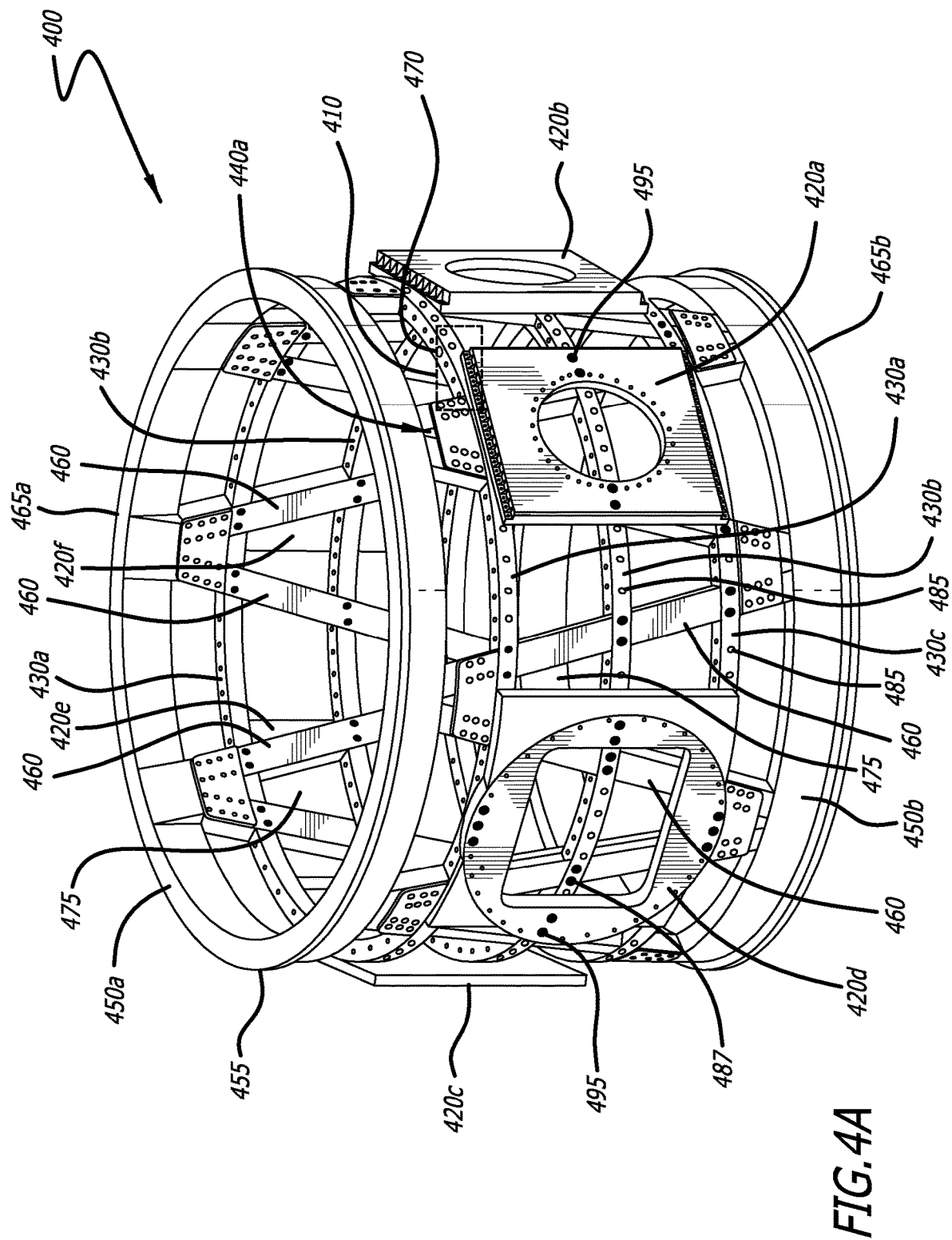
FIG. 4A is a diagram showing a perspective view of the disclosed space vehicle payload adapter, in accordance with at least one embodiment of the present disclosure.

FIG. 4A is a diagram showing a perspective view of the disclosed space vehicle payload adapter 400, in accordance with at least one embodiment of the present disclosure. The space vehicle payload adapter 400 comprises a forward ring 450a, an aft ring 450b, three interstitial rings 430a, 430b, 430c, multiple secondary payload adapters 420a, 420b, 420c, 420d, 420e, 420f, and an open truss structure comprising a plurality of struts 460. It should be noted that, in one or more embodiments, all of the components of the disclosed space vehicle payload adapter 400 are manufactured from a low cost and lightweight material(s) (e.g., a lightweight metal, such as aluminum or titanium, and/or a composite material).

Employing aluminum (and/or other lightweight material(s)) for the components of the space vehicle payload adapter 400 allows for the space vehicle payload adapter 400 to be lightweight and low cost to manufacture. In one or more embodiments, when components of the space vehicle payload adaptor 400 are manufactured from aluminum, the aluminum components are coated with a conductive Alodine finish to provide for aluminum corrosion protection. It should be noted that although the conventional space vehicle payload adapter (e.g., ring) 100 of FIG. 1 is also manufactured from aluminum (e.g., a lightweight material), the disclosed space vehicle payload adapter 400 is much lighter in weight because it employs an open truss structure design as opposed to the conventional solid monocoque ring design (e.g., refer to the ring 100 of FIG. 1), which adds a considerable amount of weight.

In FIG. 4A, the disclosed space vehicle payload adapter 400 is shown to have an annular profile defining a circumference 455. In one or more embodiments, the space vehicle payload adapter 400 comprises a forward open end 465a defined by the forward ring 450a, and comprises an aft open end 465b defined by the aft ring 450b. The forward ring 450a is configured to directly (or indirectly) couple (e.g., releasably attach) the space vehicle payload adapter 400 to a primary payload (e.g., refer to 230 of FIG. 3). And, the aft ring 450b is configured to directly (or indirectly) couple (e.g., releasably attach) the space vehicle payload adapter 400 to a launch vehicle (e.g., refer to 240 of FIG. 3).

In one or more embodiments, the forward ring 450a and the aft ring 450b have the same diameter (D), as is shown in FIG. 4A. However, in other embodiments, the forward ring 450a and the aft ring 450b may have different diameters. For example, the forward ring 450a may have a first diameter (D1) and the aft ring 450b may have a second diameter (D2), where the first diameter (D1) is larger than (or, alternatively, smaller than) the second diameter (D2). The specific diameters of the forward ring 450a and the aft ring 450b of the space vehicle payload adapter 400 are determined based on the packaging requirements of the payload fairing of the launch vehicle (e.g., refer to the payload fairing 295 of the LVUS 240 of FIG. 2).

The space vehicle payload adapter 400 also comprises an open truss structure comprising a plurality of struts 460 connecting the forward ring 450a to the aft ring 450b and, as such, each of the struts 460 extends from the forward ring 450a to the aft ring 450b. In particular, a first end of each of the struts 460 is connected to the forward ring 450a, and a second end of each of the struts 460 is connected to the aft ring 450b. In one or more embodiments, the struts 460 are oriented at consistent angles to form alternately inverted isosceles triangle-shaped openings 475 around the circumference 455 of the space vehicle payload adapter 400. This specific arrangement of the struts 460 in the open truss structure of the space vehicle payload adapter 400 is referred to in structural engineering as a "Warren truss" or an "equilateral truss".

In addition, the space vehicle payload adapter 400 comprises six secondary payload adapters 420a, 420b, 420c, 420d, 420e, 420f disposed around the circumference 455 of the space vehicle payload adapter 400. The secondary payload adapters 420a, 420b, 420c, 420d, 420e, 420f are each configured to secure (e.g., releasably attach) a secondary payload (e.g., refer to 610a, 610b, 610c, 610d, 610e, 610f of FIG. 6) onto the space vehicle payload adapter 400. In one or more embodiments, the space vehicle payload adapter 400 may comprise more (or, alternatively, less) than six secondary payload adapters 420a, 420b, 420c, 420d, 420e, 420f than as shown in FIG. 4A.

In one or more embodiments, the secondary payload adapters 420a, 420b, 420c, 420d, 420e, 420f may be of various different sizes. For example, some of the secondary payload adapters 420a, 420b, 420c, 420e may have smaller mountings than the other secondary payload adapters 420d, 420f. In particular, for example in FIG. 4A, secondary payload adapters 420a, 420b, 420c, 420e each have a small mounting size (e.g., an adapter port opening, which is circular in shape, that is approximately fifteen (15) inches in diameter) for mounting smaller secondary payloads than secondary payload adapters 420d, 420f, which have a large mounting size (e.g., an adapter port opening, which is rectangular in shape, that is approximately twenty-four (24) inches in height and width) for mounting larger secondary payloads, which are larger in size (volume) and/or weight than the smaller secondary payloads.

It should be noted that, in one or more embodiments, more (or, alternatively, less) than two different sizes (and/or weights) of secondary payload adapters 420a, 420b, 420c, 420d, 420e, 420f may be employed by the disclosed space vehicle payload adapter 400. In addition, in one or more embodiments, the secondary payload adapters 420a, 420b, 420c, 420d, 420e, 420f may comprise adapter port openings of various different shapes (e.g., triangular or a polygon) other than the circular and rectangular shapes as are shown in FIG. 4A. As such, the shapes (as well as the sizes) of the adaptor port openings of the secondary payload adaptors 420a, 420b, 420c, 420d, 420e, 420f may be customized according to (e.g., complementary to) the shapes (and sizes) of the interfaces of the secondary payloads (e.g., refer to 610a, 610b, 610c, 610d, 610e, 610f of FIG. 6) to be attached to the space vehicle payload adaptor 400. Thus, the adapter port openings of the secondary payload adapters 420a, 420b, 420c, 420d, 420e, 420f comprise shapes (and sizes) complementary to interfaces of the secondary payloads.

In addition, the secondary payload adapters 420a, 420b, 420c, 420d, 420e, 420f each comprise a plurality of bolt holes for the releasable attachment of the secondary payloads (e.g., refer to 610a, 610b, 610c, 610d, 610e, 610f of FIG. 6) via fasteners (e.g., bolts, such as kinematic mount bolts or easy ride adapters). In FIG. 4A, the bolt hole pattern on each of the secondary payload adapters 420a, 420b, 420c, 420d, 420e, 420f for the releasable attachment of the secondary payloads is shown to be in the form of a circle. However, it should be noted that, in one or more embodiments, the secondary payload adapters 420a, 420b, 420c, 420d, 420e, 420f may comprise bolt hole patterns of various different shapes (e.g., triangular or a polygon) other than the circular bolt hole pattern as is shown in FIG. 4A. The shapes (as well as the sizes) of the bolt hole patterns of the secondary payload adaptors 420a, 420b, 420c, 420d, 420e, 420f may be customized according to (e.g., complementary to) the shapes (and sizes) of the bolt hole patterns on the interfaces of the secondary payloads (e.g., refer to 610a, 610b, 610c, 610d, 610e, 610f of FIG. 6). Also, it should be noted that, in FIG. 4A, each of the secondary payload adapters 420a, 420b, 420c, 420d, 420e, 420f is depicted to be composed of a single component (not including the fasteners). However, it should be noted that, in one or more embodiments, each of the secondary payload adapters 420a, 420b, 420c, 420d, 420e, 420f may be manufactured to comprise more than one component (not including the fasteners), as is shown in FIG. 4A.

Additionally, each of the secondary payload adapters 420a, 420b, 420c, 420d, 420e, 420f is releasably attached to at least one of the interstitial rings 430a, 430b, 430c of the space vehicle payload adapter 400. The three interstitial rings 430a, 430b, 430c each comprise a plurality of mounting fixtures 485 (e.g., in the form of bolt holes) disposed on the exterior surface around the circumference 455. And, the secondary payload adapters 420a, 420b, 420c, 420d, 420e, 420f each comprise multiple attachment points 495 (e.g., in the form of bolt holes). The mounting fixtures 485 of the interstitial rings 430a, 430b, 430c are configured to releasably attach to the attachment points 495 (e.g., via removable fasteners (e.g., bolts, such as kinematic mount bolts or easy ride adapters)) of the secondary payload adapters 420a, 420b, 420c, 420d, 420e, 420f. As such, in particular in FIG. 4A, the secondary payload adapters 420a, 420b, 420c, 420d, 420e, 420f are releasably attached to at least one of the interstitial rings 430a, 430b, 430c via removable fasteners (e.g., bolts) (e.g., refer to 497 of FIG. 4B) disposed within the mounting fixtures 485 of the interstitial rings 430a, 430b, 430c and within the attachment points 495 of the secondary payload adapters 420a, 420b, 420c, 420d, 420e, 420f. For example, refer to FIG. 4B for details of the attaching of secondary payload adapter 420a to interstitial ring 430a via removable fasteners (e.g., bolts) 497.

However, it should be noted that, the use of fasteners (e.g., bolts) for the attaching of the secondary payload adapters 420a, 420b, 420c, 420d, 420e, 420f to the interstitial rings 430a, 430b, 430c is merely exemplary, and that any other device for releasably attaching the secondary payload adapters 420a, 420b, 420c, 420d, 420e, 420f to the interstitial rings 430a, 430b, 430c may be employed by the disclosed space vehicle payload adapter 400. As such, in one or more embodiments, the secondary payload adapters 420a, 420b, 420c, 420d, 420e, 420f may be releasably attached to at least one of the interstitial rings 430a, 430b, 430c by another means (e.g., by clamping, by drilling on the assembly, or by slots) other than by using fasteners (e.g., bolts) as in FIG. 4A.

In one or more embodiments, the secondary payload adapters 420a, 420b, 420c, 420d, 420e, 420f are "clockable" such that they may be moved to different locations (e.g., to different clockable positions) around the circumference of the space vehicle payload adapter 400 to balance the center of gravity of the launch vehicle. For example, at least one of the secondary payload adapters 420a, 420b, 420c, 420d, 420e, 420f may be removed from its location on the circumference 455 of the space vehicle payload adapter 400 and, then, attached to another location on the circumference 455 of the space vehicle payload adapter 400. In particular, one of the secondary payload adapters 420a, 420b, 420c, 420d, 420e, 420f may be released from its attachment to a first location on at least one of the interstitial rings 430a, 430b, 430c. Then, the secondary payload adapter 420a, 420b, 420c, 420d, 420e, 420f may be releasably attached to a second location on at least one of the interstitial rings 430a, 430b, 430c.

It should be noted that the center of gravity of the launch vehicle should be balanced to ensure controllability during launch. If the secondary payloads (e.g., refer to 610a, 610b, 610c, 610d, 610e, 610f of FIG. 6) are not of equal size (volume) and/or mass, and/or are attached to the payload adapter in a non-symmetrical manner, then the center of gravity of the launch vehicle may exceed the controllable offset limit. As a result, a ballast may be required to provide balance to the launch vehicle. However, introducing a ballast reduces the amount of usable payload mass that the launch vehicle can carry.

Each of the interstitial rings 430a, 430b, 430c of the space vehicle payload adapter 400 is attached to the struts 460 of the open truss structure of the space vehicle payload adapter 400. Each of the struts 460 comprises a plurality of mounting apertures 487 (e.g., in the form of bolt holes) each configurable to receive a fastener (e.g., a bolt). The mounting fixtures 485 of the interstitial rings 430a, 430b, 430c are configured to attach to the mounting apertures 487 (e.g., via removable fasteners (e.g., bolts)) of the struts 460. Also, each of the struts 460 comprises at least one V-shaped joint (e.g., refer to 492 of FIG. 4D), which comprises a first portion (e.g., refer to 482a of FIG. 4D) and a second portion (e.g., refer to 482b of FIG. 4D), configured to receive one of the interstitial rings 430a, 430b, 430c.

For example, for the attaching of an interstitial ring 430b (refer to FIG. 4D) to a strut 460, the interstitial ring 430b is disposed within the V-shaped joint (e.g., refer to 492 of FIG. 4D) of the strut 460, thereby forming a nested joint. Specifically, the interstitial ring 430b slides between the first portion (e.g., refer to 482a of FIG. 4D) and the second portion (e.g., refer to 482b of FIG. 4D) of the V-shaped joint (e.g., refer to 492 of FIG. 4D) of the strut 460. After the interstitial ring 430b is disposed within the V-shaped joint (e.g., refer to 492 of FIG. 4D) of the strut 460, the strut 460 is attached to the interstitial ring 430b via fasteners (e.g., bolts) disposed within the mounting apertures 487 of the strut 460 and within the mounting fixtures 485 of the interstitial ring 430b. Refer to FIG. 4D for details of the attaching of a strut 460 to an interstitial ring 430b.

It is important to note that the interstitial rings 430a, 430b, 430c are employed by the the disclosed space vehicle payload adapter 400 to provide sufficient stiffness to the space vehicle payload adapter 400 such that high frequency modes (e.g., >30 GHz) are always maintained during all aspects of launch (e.g., during all of the phases of the launch sequence). During launch, the primary payload 230 as well as the secondary payloads 220a, 220b, 220c experience high levels of vibration. The high levels of vibration experienced by the secondary payloads 220a, 220b, 220c create bending loads in the secondary payload adapters 420a, 420b, 420c, 420d, 420e, 420f. The interstitial rings 430a, 430b, 430c react the bending loads in the secondary payload adapters 420a, 420b, 420c, 420d, 420e, 420f into the struts 460 of the open truss structure. The struts 460 then react the loads to the forward ring 450a and aft ring 450b and, as a result, high frequency modes are maintained for the space vehicle payload adapter 400.

It should be noted that in one or more embodiments, the disclosed space vehicle payload adapter 400 comprises more than two full interstitial rings 430a, 430b, 430c. By employing more than two full interstitial rings 430a, 430b, 430c within the disclosed space vehicle payload adapter 400, high frequency modes are able to be maintained for the space vehicle payload adapter 400. And, in one or more embodiments, at least one of the interstitial rings 430a, 430b, 430c employed by the disclosed space vehicle payload adapter 400 may be merely a partial interstitial ring 430a, 430b, 430c (e.g., comprising at least one segment of an interstitial ring 430*a*, 430*b*, 430*c*, but not all of the segments for a full interstitial ring 430*a*, 430*b*, 430*c*).

Figure 4B:
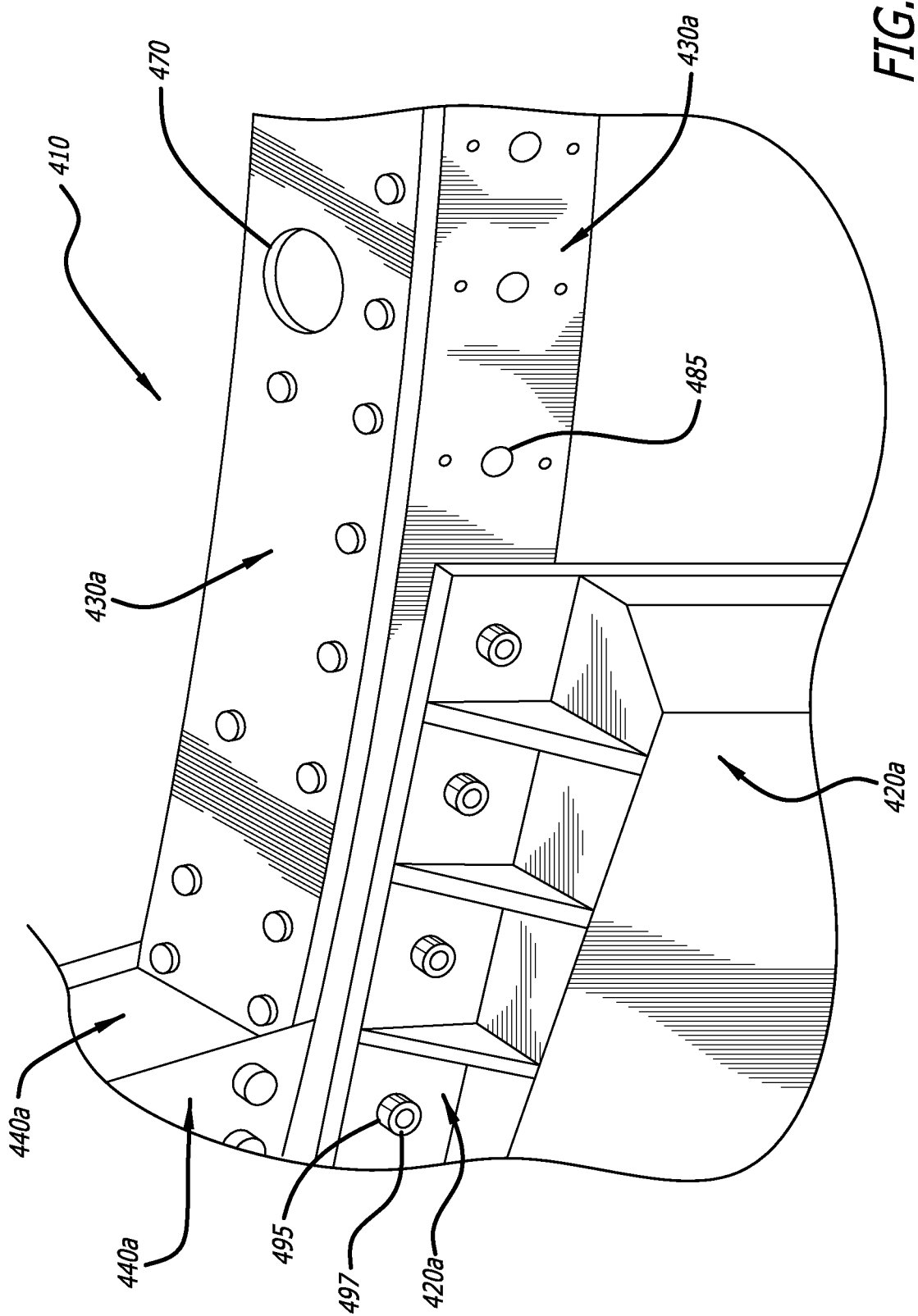
FIG. 4B is a diagram showing details of a portion of the disclosed space vehicle payload adapter of FIG. 4A, in accordance with at least one embodiment of the present disclosure.

FIG. 4B is a diagram showing details of a portion 410 of the disclosed space vehicle payload adapter 400 of FIG. 4A, in accordance with at least one embodiment of the present disclosure. In particular, the diagram of FIG. 4B shows details of a portion 410 in FIG. 4A depicting the releasable attachment of secondary payload adapter 420*a* to interstitial ring 430*a*. In particular, in this figure, the secondary payload adapter 420*a* is shown to be releasably attached to interstitial ring 430*a* via removable fasteners (e.g., bolts) 497 disposed within the mounting fixtures 485 of the interstitial ring 430*a* and within the attachment points 495 of the secondary payload adapter 420*a*.

Figure 4C:
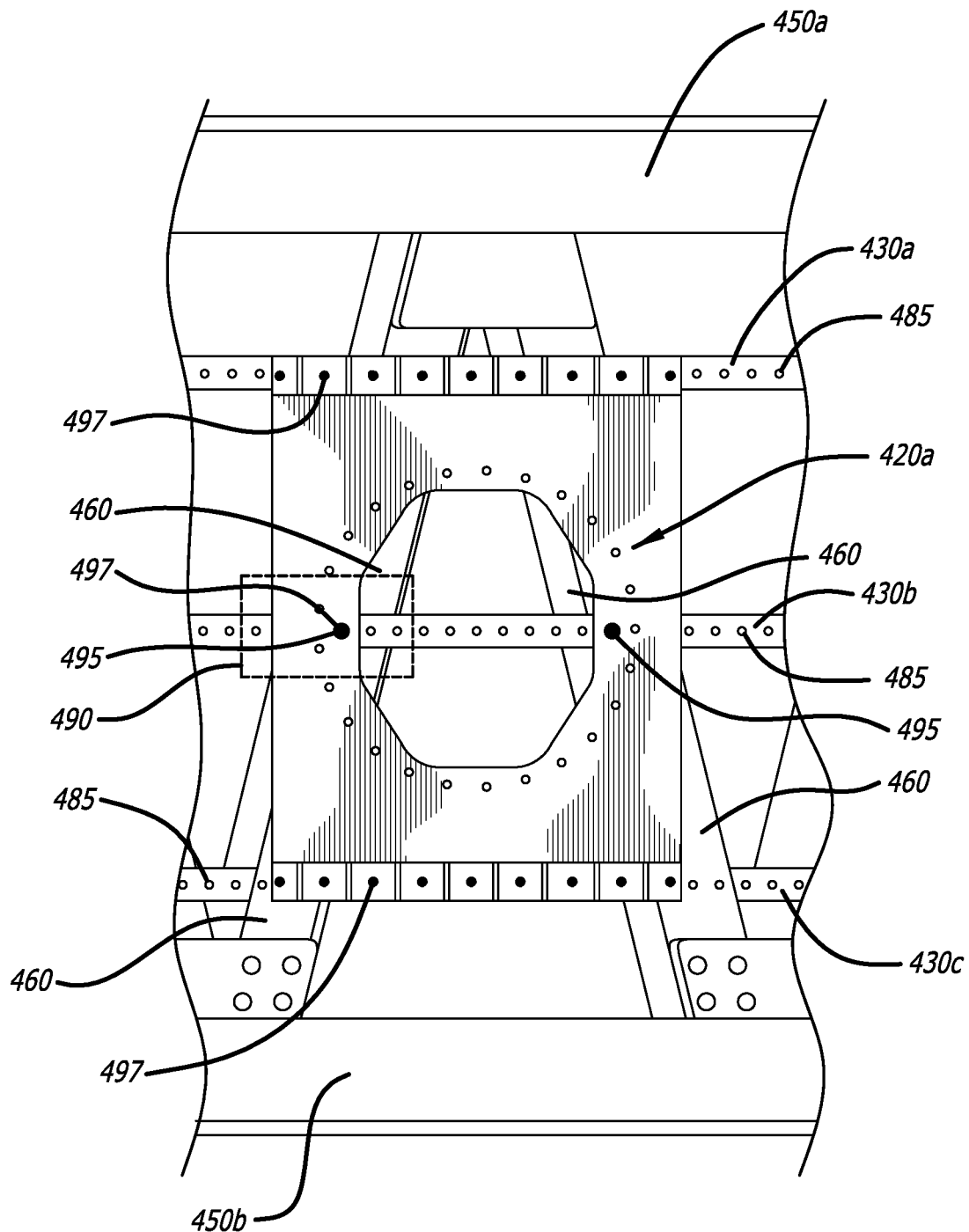
FIG. 4C is a diagram showing details of one of the secondary payload adapters of the disclosed space vehicle payload adapter of FIG. 4A, in accordance with at least one embodiment of the present disclosure.
Figure 4D:
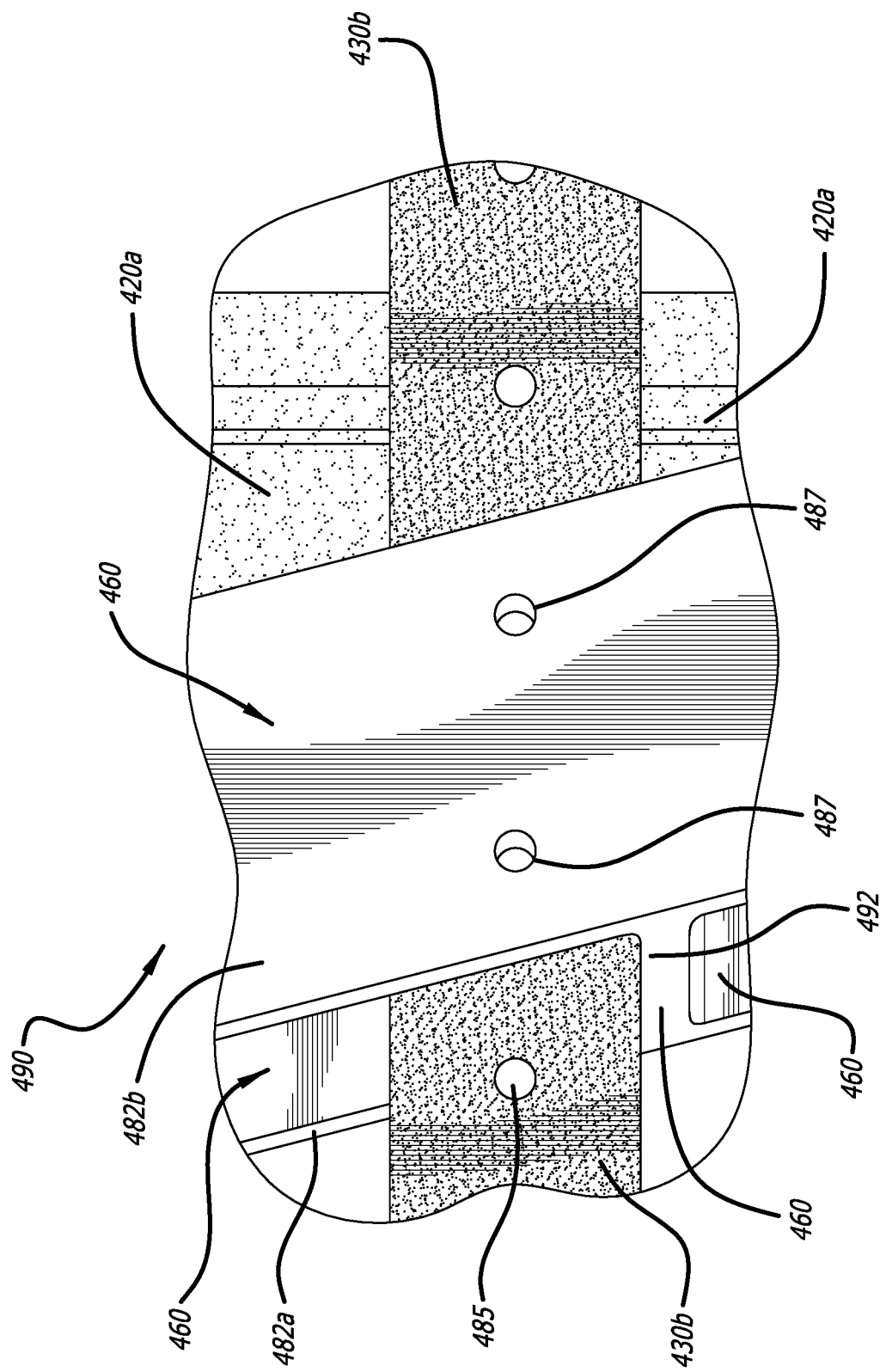
FIG. 4D is a diagram showing details of the nested joint design for the interstitial rings of the disclosed space vehicle payload adapter of FIG. 4A, in accordance with at least one embodiment of the present disclosure.

FIG. 4C is a diagram showing details of one of the secondary payload adapters 420*a* of the disclosed space vehicle payload adapter 400 of FIG. 4A, in accordance with at least one embodiment of the present disclosure. In particular, in this figure, details of the releasable attachment of secondary payload adapter 420*a* to all three interstitial rings 430*a*, 430*b*, 430*c* is shown.

FIG. 4D is a diagram showing details of the nested joint design for the interstitial rings (e.g., interstitial ring 430*b*) of the disclosed space vehicle payload adapter 400 of FIG. 4A, in accordance with at least one embodiment of the present disclosure. In particular, the diagram of FIG. 4D shows details of the interior side (e.g., the back side not visible in FIG. 4C) of the portion 490 denoted in FIG. 4C. In FIG. 4D, interstitial ring 430*b* is shown to be attached to a strut 460. For the attaching, the interstitial ring 430*b* is disposed between the first portion 482*a* and the second portion 482*b* of the V-shaped joint 492 of the strut 460, resulting in a nested joint configuration. Then, the strut 460 is attached to the interstitial ring 430*b* via fasteners (e.g., bolts) (not shown in FIG. 4D) disposed within the mounting apertures 487 of the strut 460 and within the mounting fixtures 485 of the interstitial ring 430*b*.

Figure 4E:
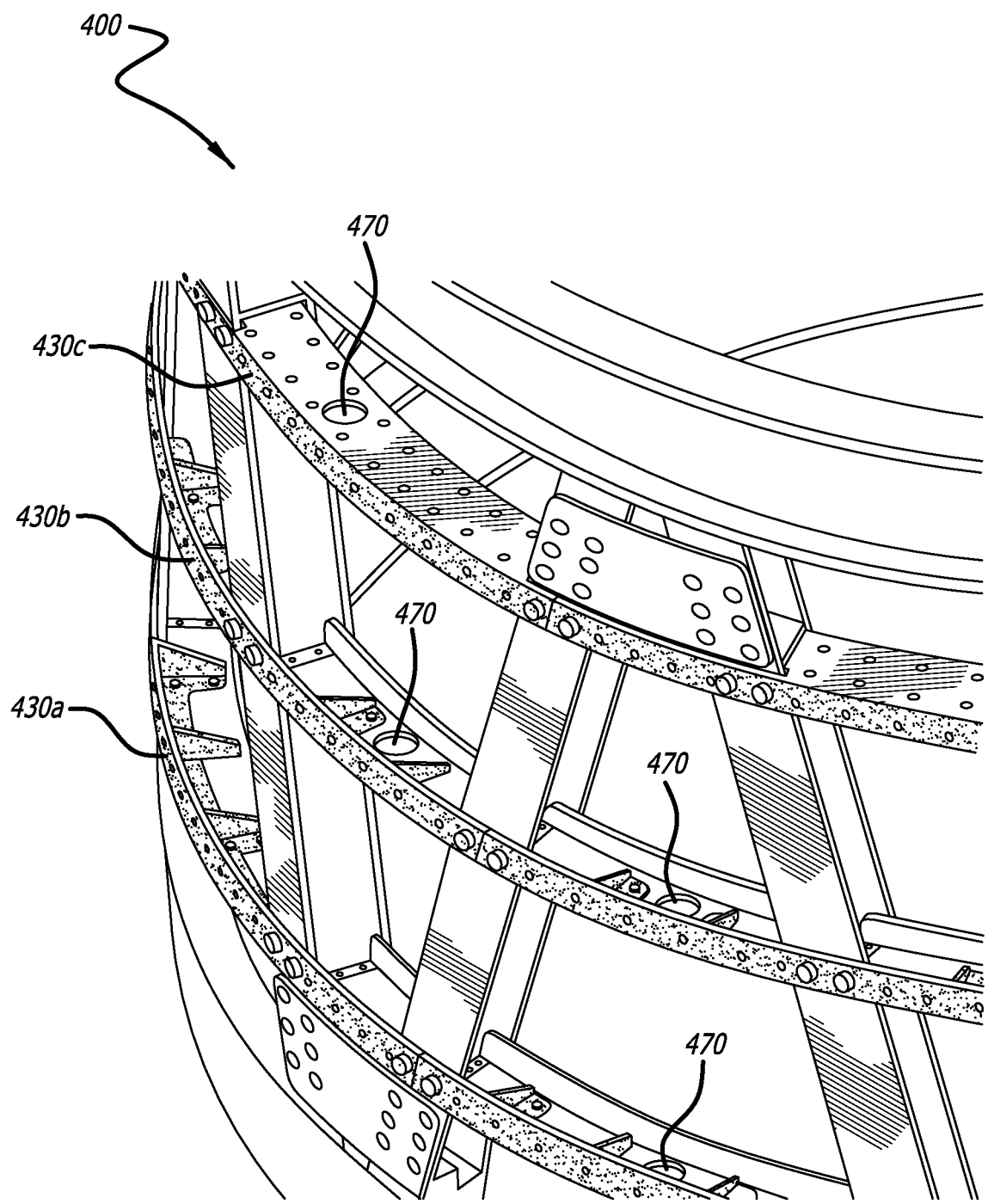
FIG. 4E is a diagram showing details of the two-part design for the interstitial rings of the disclosed space vehicle payload adapter of FIG. 4A, in accordance with at least one embodiment of the present disclosure.

FIG. 4E is a diagram showing details of the two-part design for the interstitial rings 430*a*, 430*b*, 430*c* of the disclosed space vehicle payload adapter 400 of FIG. 4A, in accordance with at least one embodiment of the present disclosure. And, FIG. 4F is an exploded detailed view of the diagram of FIG. 4E showing details of the two-part design (e.g., showing the inner portions (I) and outer portions (O)) of the interstitial rings 430*a*, 430*b*, 430*c* of the disclosed space vehicle payload adapter 400 of FIG. 4A, in accordance with at least one embodiment of the present disclosure.

It should be noted that the two-part design shown in FIGS. 4E and 4F may be used in conjunction with (or, alternatively, used without) the nested joint design shown in FIG. 4D for the disclosed interstitial rings 430*a*, 430*b*, 430*c*. Similarly, it should be noted that the nested joint design shown in FIG. 4D may be used in conjunction with (or, alternatively, used without) the two-part design shown in FIGS. 4E and 4F for the disclosed interstitial rings 430*a*, 430*b*, 430*c*. In addition, it should be noted that the designs shown in FIGS. 4D, 4E, and 4F are merely exemplary designs for the nested joint design and the two-part design for the disclosed interstitial rings and, as such, in one or more embodiments, variations and modifications to these designs may be made without departing from the spirit and scope of the disclosure.

In one or more embodiments, for the two-part design shown in FIGS. 4E and 4F, each of the interstitial rings 430*a*, 430*b*, 430*c* comprises multiple (e.g., six) sections (e.g., segments (1), (2), (3), (4), (5), and (6)) circumferentially. And, each of the segments (1), (2), (3), (4), (5), and (6) of each interstitial ring 430*a*, 430*b*, 430*c* comprises an inner portion (I) and an outer portion (O). For example, in FIG. 4F, interstitial ring 430*c* is shown to comprise multiple segments, such as a first segment (1) and a second segment (2). And, each segment (1), (2) is shown to comprise an inner portion (I) and an outer portion (O). As such, in the exploded view of FIG. 4E, interstitial ring 430*c* is shown to comprise 430*c*(1)(O) (i.e., segment (1), outer portion (O)); 430*c*(1)(I) (i.e., segment (1), inner portion (I)); 430*c*(2)(O) (i.e., segment (2), outer portion (O)); and 430*c*(2)(I) (i.e., segment (2), inner portion (I)). The outer portions (O) of each of the segments (1), (2), (3), (4), (5), and (6) are attached to their corresponding inner portions (I) via at least one fastener (e.g., bolt) 472. For example, with regard to segment (1) of interstitial ring 430*c*, 430*c*(1)(O) is attached to 430*c*(1)(I) via fasteners (e.g., bolts) 472.

Figure 5:
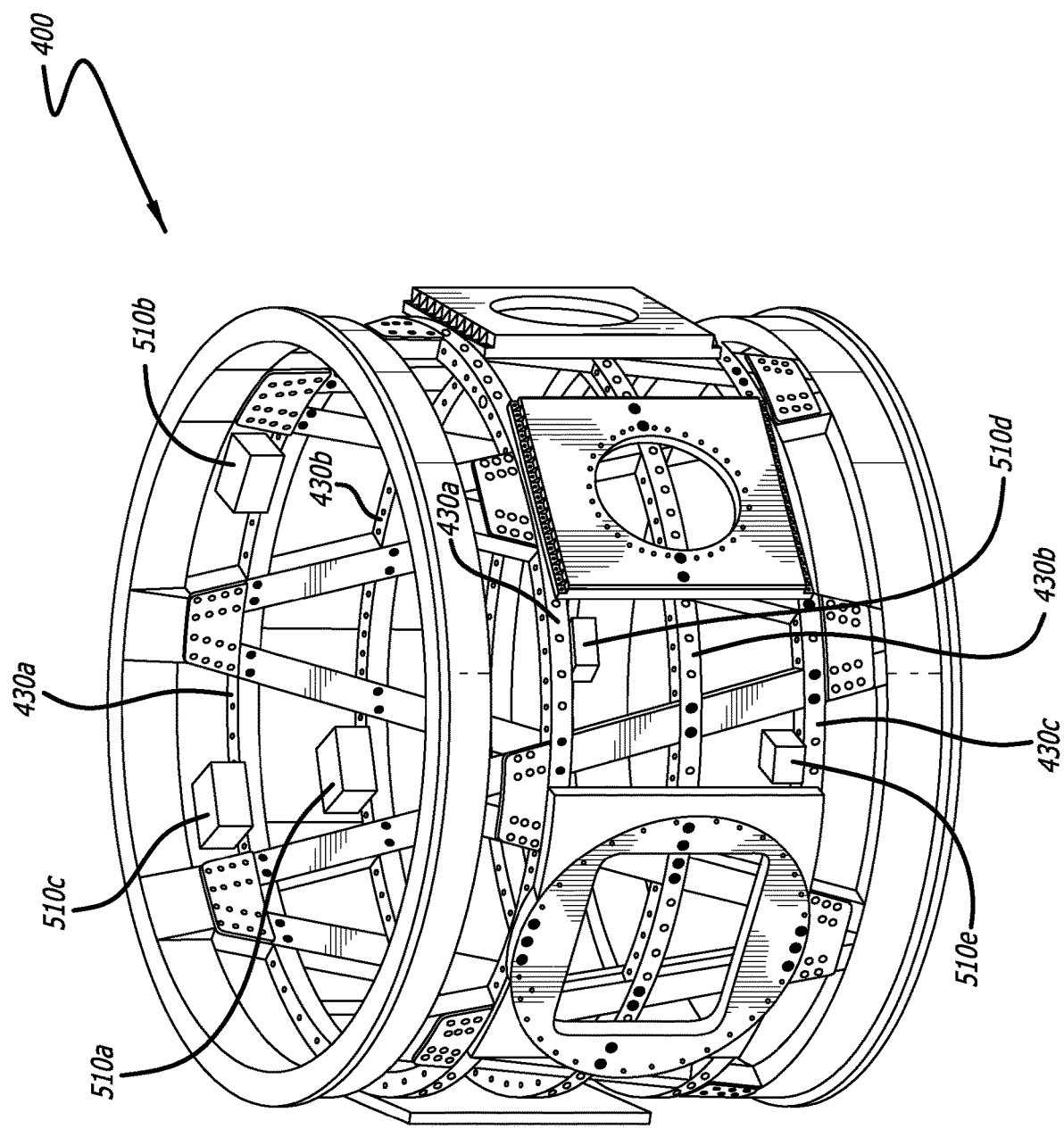
FIG. 5 is a diagram showing a perspective view of the disclosed space vehicle payload adapter of FIG. 4A, where electronic components are mounted onto the interstitial rings, in accordance with at least one embodiment of the present disclosure.

FIG. 5 is a diagram showing a perspective view of the disclosed space vehicle payload adapter 400 of FIG. 4A, where electronic components 510*a*, 510*b*, 510*c*, 510*d*, 510*e* are mounted onto the interstitial rings 430*a*, 430*b*, 430*c*, in accordance with at least one embodiment of the present disclosure. In one or more embodiments, the interstitial rings 430*a*, 430*b*, 430*c* are configured to accommodate electrical equipment. In this figure, various different electrical components 510*a*, 510*b*, 510*c*, 510*d*, 510*e* are shown to be mounted to the top (forward) side or the bottom (aft) side of the interstitial rings 430*a*, 430*b*, 430*c*. Various different types of electrical equipment may be mounted onto the interstitial rings 430*a*, 430*b*, 430*c* of the disclosed space vehicle payload adapter 400 including, but not limited to, a power source (e.g., a battery), a propulsion and mechanism module (PAM), and an embedded relay module (ERM).

It should be noted that in one or more embodiments, the interstitial rings 430*a*, 430*b*, 430*c* comprise wiring holes (e.g., refer to 470 in FIGS. 4B, 4E, and 4F) to provide pathways for routing wiring from the electrical components 510*a*, 510*b*, 510*c*, 510*d*, 510*e* between the struts 460. As such, wiring connected to the electrical components 510*a*, 510*b*, 510*c*, 510*d*, 510*e* may be fed through the wiring holes on the interstitial rings 430*a*, 430*b*, 430*c* to their corresponding payloads.

Figure 6:
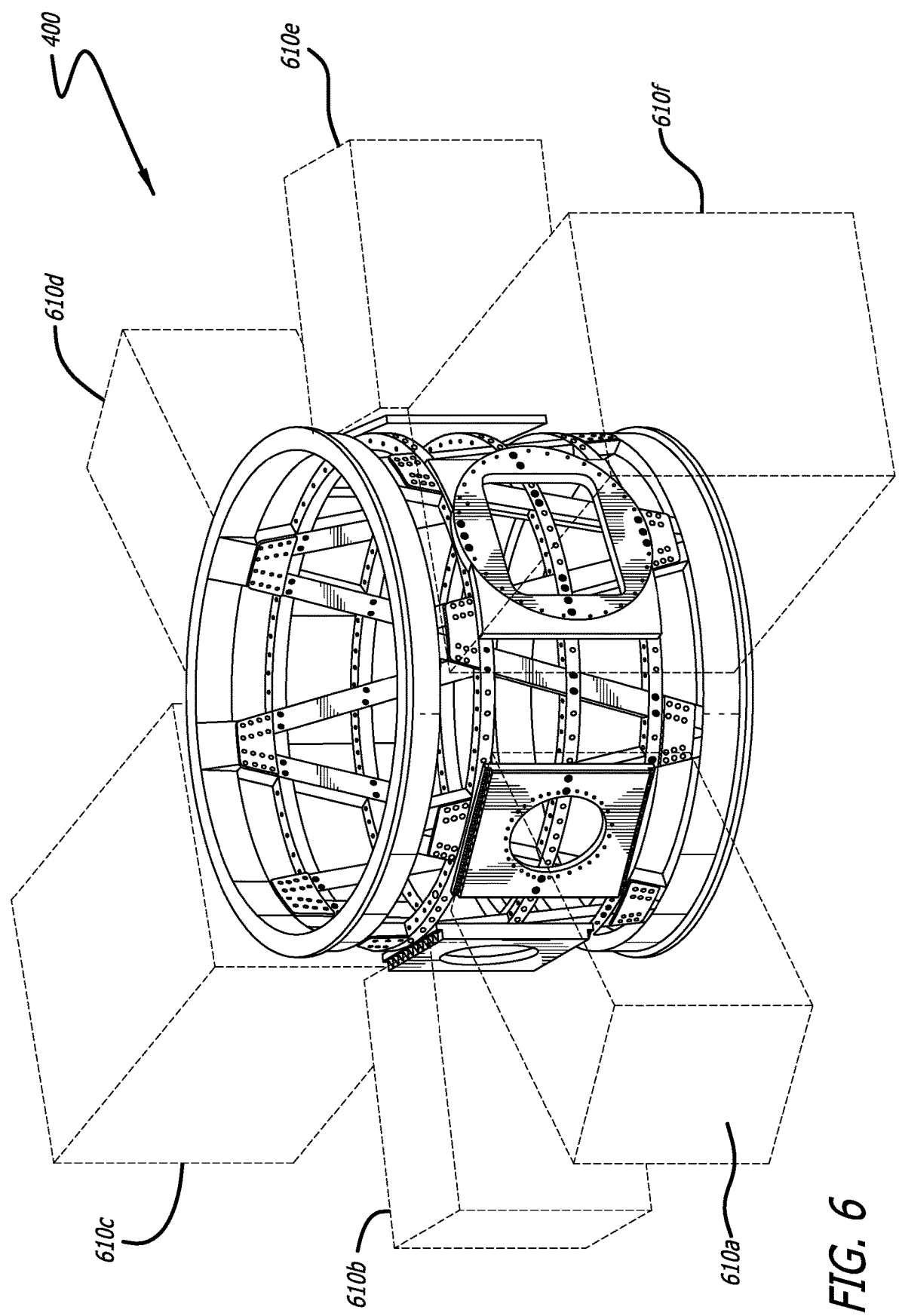
FIG. 6 is a diagram showing a perspective view of secondary satellites mounted onto the disclosed space vehicle payload adapter of FIG. 4A, in accordance with at least one embodiment of the present disclosure.

FIG. 6 is a diagram showing a perspective view of secondary satellites (e.g., secondary payloads) 610*a*, 610*b*, 610*c*, 610*d*, 610*e*, 610*f* mounted onto the disclosed space vehicle payload adapter 400 of FIG. 4A, in accordance with at least one embodiment of the present disclosure. In this figure, the secondary payloads 610*a*, 610*b*, 610*c*, 610*d*, 610*e*, 610*f* radially mounted onto the space vehicle payload adapter 400 are of unequal size (volume) and mass. In particular, secondary payloads 610*a*, 610*b*, 610*d*, 610*e* are shown to be smaller in size (volume) than secondary payloads 610*c*, 610*f*. It should be noted that the configuration shown in FIG. 6 is merely exemplary in nature and that any number and composition of secondary payloads 610*a*, 610*b*, 610*c*, 610*d*, 610*e*, 610*f* may be mounted to the disclosed space vehicle payload adapter 400. In addition, it should be noted that although FIG. 6 shows the secondary payloads 610*a*, 610*b*, 610*c*, 610*d*, 610*e*, 610*f* space equidistantly apart from one another, the locations of the secondary payloads 610*a*, 610*b*, 610*c*, 610*d*, 610*e*, 610*f* mounted onto the space vehicle payload adapter 400 may vary.

Figure 7:
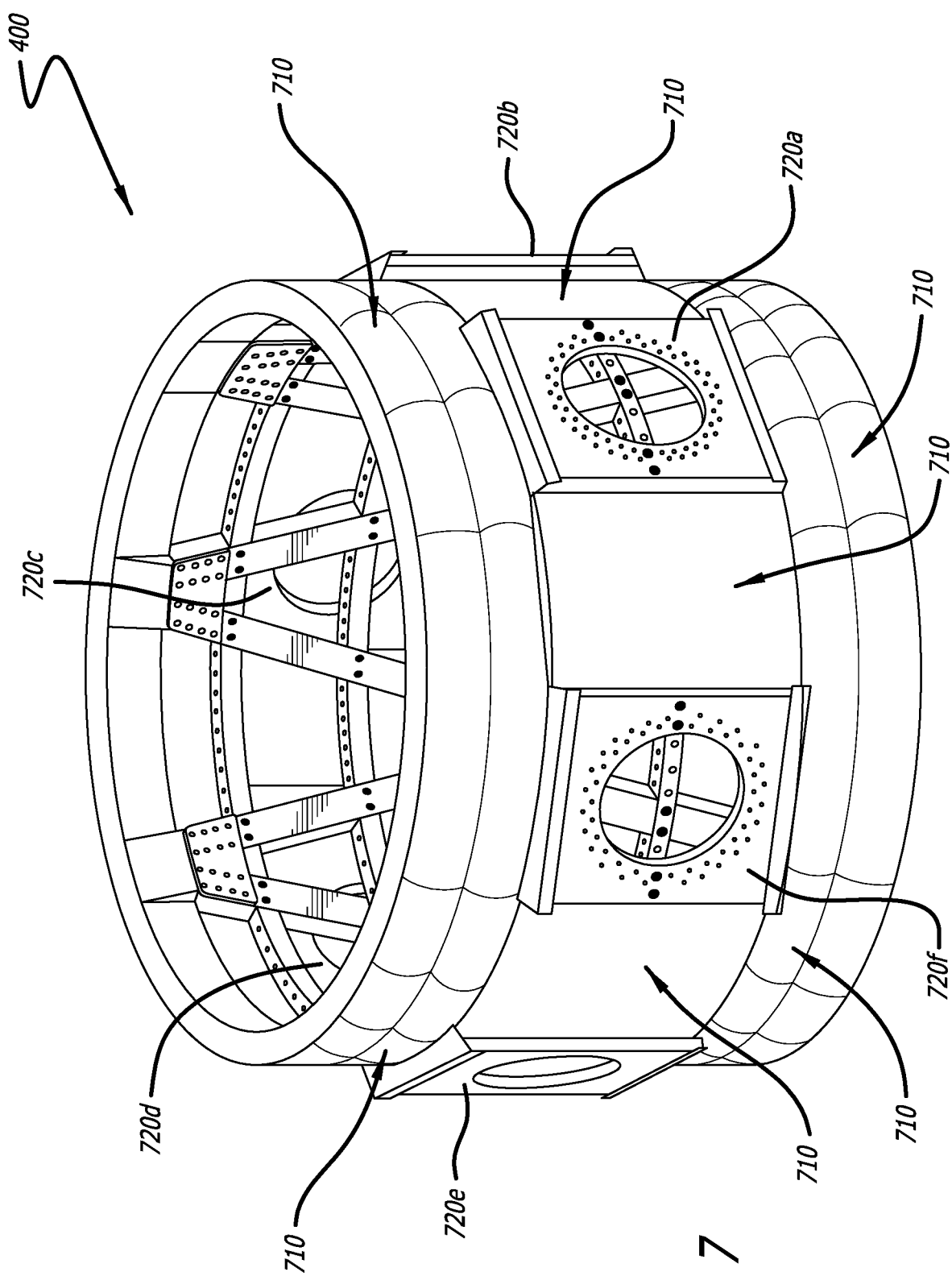
FIG. 7 is a diagram showing a perspective view of the disclosed space vehicle payload adapter of FIG. 4A comprising circumferential exterior multi-layer insulation (MLI), in accordance with at least one embodiment of the present disclosure.

FIG. 7 is a diagram showing a perspective view of the disclosed space vehicle payload adapter 400 of FIG. 4A comprising circumferential exterior multi-layer insulation (MLI) 710, in accordance with at least one embodiment of the present disclosure. In this figure, the exterior circumference 455 (excluding the secondary payload adapters 720*a*, 720*b*, 720*c*, 720*d*, 720*e*, 720*f*) of the space vehicle payload adapter 400 is covered (e.g., wrapped) with a MLI 710 material, such a MLI 710 blanket. MLI 710 is a thermal insulation comprising multiple layers (e.g., six layers) of thin sheets. Wrapping the space vehicle payload adapter 400 with MLI 710 ensures that the space vehicle payload adapter 400 maintains a constant interior temperature despite the extreme temperature fluctuations in space.

Figure 8:
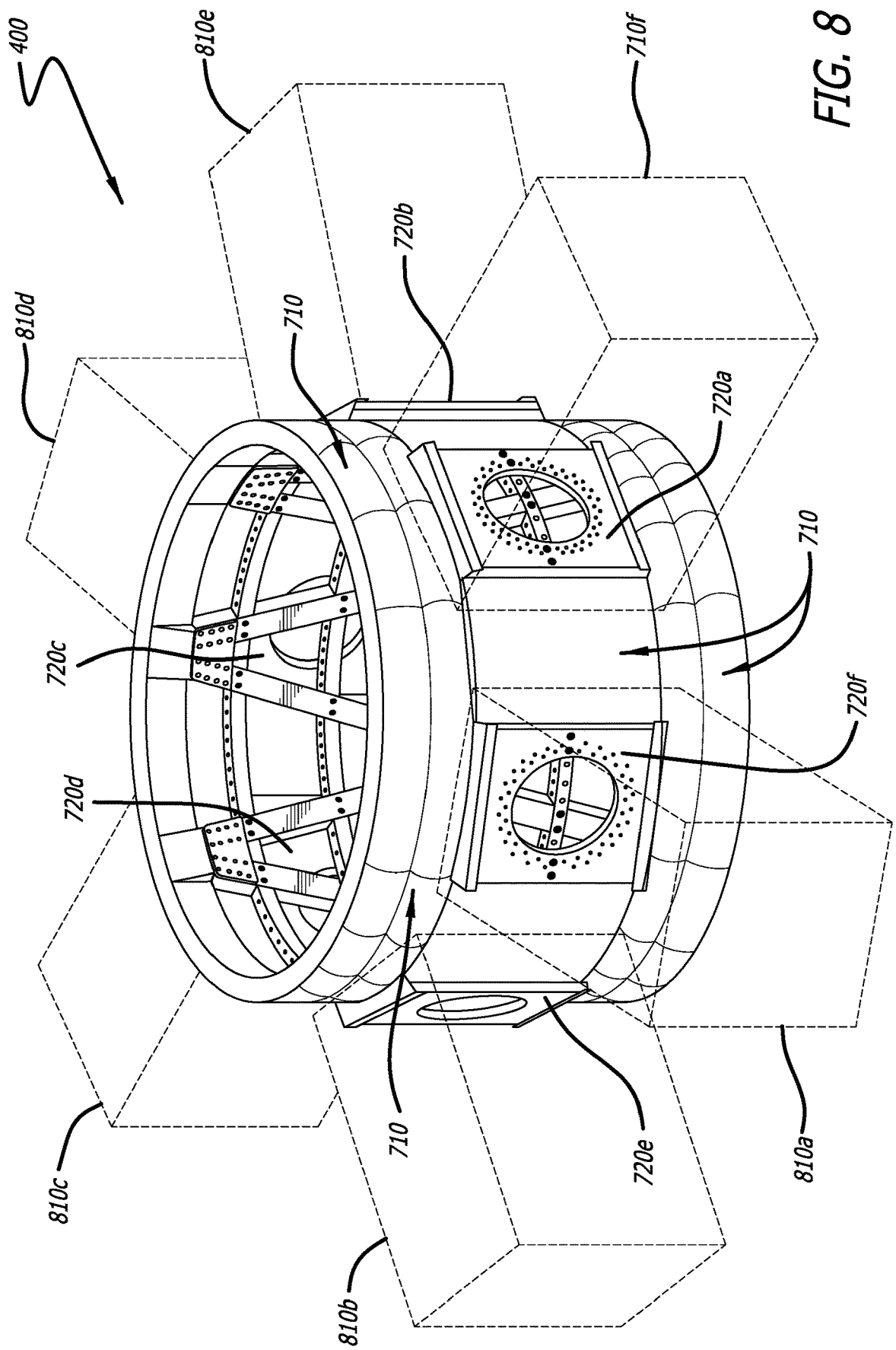
FIG. 8 is a diagram showing a perspective view of secondary satellites mounted onto the disclosed space vehicle payload adapter of FIG. 4A comprising circumferential exterior MLI, in accordance with at least one embodiment of the present disclosure.

FIG. 8 is a diagram showing a perspective view of secondary satellites (e.g., secondary payloads) 610a, 610b, 610c, 610d, 610e, 610f mounted onto the disclosed space vehicle payload adapter 400 of FIG. 4A comprising circumferential exterior MLI 710, in accordance with at least one embodiment of the present disclosure. In this figure, the MLI 710 blanket is shown to be covering the exterior surface around the circumference of the space vehicle payload adapter 400, except for the portions of the exterior surface comprising the secondary payload adapters.

Figure 9:
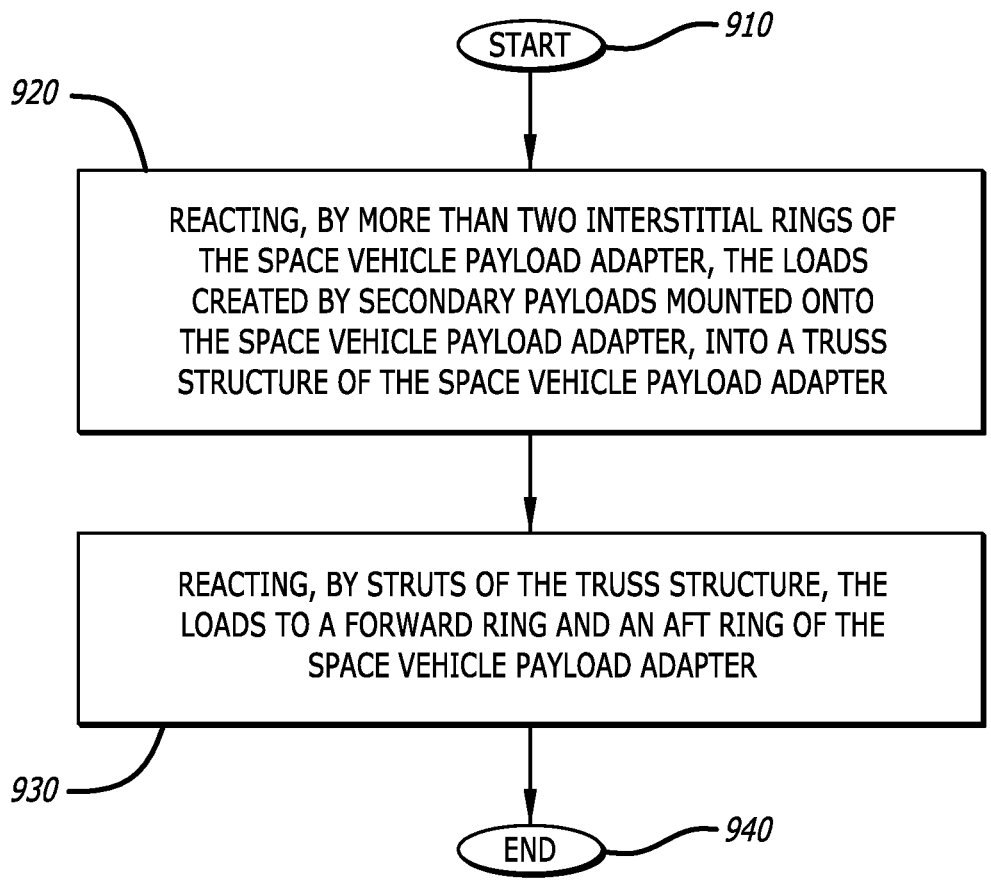
FIG. 9 is a flow chart for the disclosed method for reacting loads into a space vehicle payload adapter, in accordance with at least one embodiment of the present disclosure.

FIG. 9 is a flow chart for the disclosed method 900 for reacting loads into a space vehicle payload adapter, in accordance with at least one embodiment of the present disclosure. At the start 910 of the method 900, more than two interstitial rings, of the space vehicle payload adapter, react the loads, created by secondary payloads mounted onto the space vehicle payload adapter, into a truss structure of the space vehicle payload adapter 920. Then, struts of the truss structure, react the loads to a forward ring and an aft ring of the space vehicle payload adapter 930. Then, the method 900 ends 940.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed. Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for reacting loads into a space vehicle payload adapter, the method comprising:
   reacting, by more than two interstitial rings of the space vehicle payload adapter, the loads created by secondary payloads mounted onto the space vehicle payload adapter, into a truss structure of the space vehicle payload adapter; and
   reacting, by struts of the truss structure, the loads to a forward ring and an aft ring of the space vehicle payload adapter, wherein the struts comprise strut portions extending beyond the interstitial rings to connect to the forward and aft rings to react the loads to the forward and aft rings.

2. The method of claim 1, wherein the secondary payloads are mounted onto the space vehicle payload adapter via secondary payload adapters.

3. The method of claim 2, wherein the secondary payloads are mounted onto the secondary payload adaptors via at least one of kinematic mount bolts or easy ride adapters.

4. The method of claim 2, wherein:
   the space vehicle payload adapter has an annular profile defining a circumference of the space vehicle payload adapter,
   an exterior surface of the circumference of the space vehicle payload adapter comprises a surface of each of the secondary payload adapters, and
   each of the secondary payload adapters are releasably attached to various different locations on at least one of the interstitial rings.

5. The method of claim 2, wherein adapter port openings of the secondary payload adapters are of different sizes.

6. The method of claim 2, wherein adapter port openings of the secondary payload adaptors comprise shapes complementary to interfaces of the secondary payloads.

7. The method of claim 2, wherein the secondary payload adapters are manufactured from at least one of aluminum, titanium, or a composite material.

8. The method of claim 1, wherein:
   the space vehicle payload adapter has an annular profile defining a circumference of the space vehicle payload adapter, and
   the forward and aft rings, the truss structure, and the interstitial rings are configured to support the secondary payloads mounted around an exterior surface of the circumference of the space vehicle payload adapter.

9. The method of claim 1, wherein the struts are oriented at consistent angles to form alternately inverted isosceles triangle-shaped openings within the truss structure.

10. The method of claim 1, wherein the interstitial rings are connected to the struts via a nested joint configuration.

11. The method of claim 1, wherein the interstitial rings are located between the forward ring and the aft ring.

12. The method of claim 1, wherein at least one of the interstitial rings is a partial interstitial ring.

13. The method of claim 1, wherein at least one of the interstitial rings comprises a plurality of segments.

14. The method of claim 13, wherein each of the segments comprises an inner portion and an outer portion.

15. The method of claim 1, wherein at least one of the interstitial rings, the struts, the forward ring, or the aft ring are manufactured from at least one of aluminum, titanium, or a composite material.

16. A space vehicle payload adapter, the space vehicle payload adapter comprising:
   a forward ring;
   an aft ring;
   a truss structure comprising a plurality of struts, wherein the struts connect the forward ring to the aft ring;
   more than two interstitial rings connected to the struts, and positioned between the forward ring and the aft ring; and
   a plurality of secondary payload adapters each releasably attached to at least one of the interstitial rings, wherein the interstitial rings react loads, created by secondary payloads mounted onto the secondary payload adapters, into the truss structure, and wherein the struts of the truss structure react the loads to the forward ring and the aft ring, the struts comprising strut portions extending beyond the interstitial rings to connect to the forward and aft rings to react the loads to the forward and aft rings.

17. The space vehicle payload adapter of claim 16, wherein the interstitial rings are connected to the struts via a nested joint configuration.

18. The space vehicle payload adapter of claim 16, wherein:

the space vehicle payload adapter has an annular profile defining a circumference of the space vehicle payload adapter, an exterior surface of the circumference of the space vehicle payload adapter comprises a surface of each of the secondary payload adapters, for mounting the secondary payloads around the exterior surface of the space vehicle payload adapter, and at least one of the interstitial rings comprises a plurality of segments.

\* \* \* \* \*